June 12, 1951     E. A. STALKER     2,556,710
DIRECT LIFT AIRCRAFT

Filed Feb. 20, 1945     2 Sheets-Sheet 1

INVENTOR.
*Edward A. Stalker*

June 12, 1951  E. A. STALKER  2,556,710
DIRECT LIFT AIRCRAFT
Filed Feb. 20, 1945  2 Sheets-Sheet 2

INVENTOR.
Edward A. Stalker

Patented June 12, 1951

2,556,710

UNITED STATES PATENT OFFICE 2,556,710

DIRECT LIFT AIRCRAFT

Edward A. Stalker, Bay City, Mich.

Application February 20, 1945, Serial No. 578,911

1 Claim. (Cl. 170—135.4)

My invention relates to aircraft and particularly to helicopters. It has as an object to provide a means of increasing the lift per horsepower characterized by great mechanical simplicity. Another object is to provide a blade form particularly adapted to improve further the means of augmenting the lift-power ratio. Another object is to provide a rotor having slotted blades having free access to air for the internal flow of air to the slots for all orbital positions of the blades. Other objects will appear from the description and drawings.

The preferred embodiment of the aircraft herein contemplated is illustrated in the accompanying drawings in which—

Figure 1:
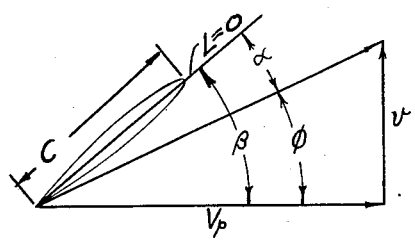
Figure 1 is a vector diagram pertaining to the theory of propulsion.

The present invention provides a simple method of operating the lifting rotor both in hovering and horizontal flight to achieve the maximum efficiency and effectiveness.

It is shown that if very low internal pressures can be used within a blade to supply a jet flowing out of the blade there is a critical range of lift coefficients $C_L$ which will give the best ratio of rotor lift to power and that this range lies outside of the present operating conditions. It is further shown that this low internal pressure is best used with a special airfoil section which has such a form that the relative wind divides at the forward end of the mean camber line and provides a favorable pressure gradient substantially as far rearward as the location of the slot.

It is a further feature that the entrance to the blades presents no obstruction to the flow to dissipate any of the energy in the flow to the slots. This freedom from turbulence is essential if the lift-power ratio is to have a value substantially above contemporary practice in the hovering state and will be successful in the forward flight regime if the internal pressure is kept to low values.

It will be proved by analysis that a large gain in the gross load per horsepower can be achieved for a helicopter by operating its blades at a large pitch angle and a proper value of the lift coefficient $C_L$. This value is not however the maximum value that can be obtained for $C_L$ with the given blade section and should not be confused with the search for large maximum values of $C_L$ to lower the landing speed of fixed wing aircraft. In the use described here the application is one of the maximum total lift in pounds from the rotor for an expenditure of a certain amount of power during the hovering state—not a matter of obtaining the maximum lift coefficient for a blade. In fact if the lift coefficient of a blade were near the maximum the lift of the rotor as a whole would be near a minimum for a given horsepower because its rate of rotation would decrease.

The blade is equipped with a discharge slot leading out of its interior and it is set at a large pitch angle and rotated by a prime mover supplying power aside from the jet from the slot. Air is supplied to the interior of the blades at a low pressure to provide a jet from the slot to create the proper lift and drag coefficients. Under the hovering condition all the blades receive the same quantity of air internally. As the helicopter is directed into horizontal flight the air is allowed to have as free access to the blade interior for one orbital position as for another.

The rotor requires power to induce the vertical or axial flow from which the lift arises (induced power) and to overcome the friction drag of bearings and the profile drag of the blades. If the lift coefficient could be increased without a large consumption of power, the rotor could generate its required lift at a smaller rate of rotation. Since the profile drag power varies with the cube of the tip speed a slower rate of rotation will make a large saving in profile drag power.

There is a very critical value of the lift coefficient realizable with boundary layer control which makes the ratio of lift to horsepower expended a minimum. This value of the lift coefficient lies above values in use or proposed for helicopter blades. The regime of operation is determined as follows:

The helicopter rotors of this invention are to be operated during hovering at values less than the value of the ratio of the peripheral speed at the 0.7 tip radius (0—7 R₁) to the disk loading as given by the Equation 1.

$$\frac{V_p^2}{w} = \frac{2}{0.57\rho\left(1+\frac{0.57\sigma}{4-0.57\sigma}\right)} \quad (1)$$

where $w$ is the disk loading in pounds per square feet, equal to the total weight divided by the $\pi R_1^2$, and $\sigma$ is the solidity based on the chord C at $0.7R_1$. That is $$\rho = \frac{BR_c}{\pi R^2} \quad (2)$$

The mass density of the air is $\rho$ expressed in slugs per cubic foot. B is the number of blades in the rotor. The velocity $V_p$ is to be in feet per second and the radius in feet.

Equation 1 represents a value of the peripheral speed at $0.7R_1$ which is far below current practice and theory, as will appear from the following development.

Let the vertical thrust on an annulus of the rotor be $T_1$, the radius at $0.7R_1$ ($R_1$ = tip radius) be R and $v$ the inflow velocity. For an annulus at $0.7R_1$ of width $l$, we have from the momentum theory $$T_1 = \pi R l \rho v \cdot 2v = 2\pi R l \rho v^2 \quad (3)$$

as is well known in aerodynamics.

For B blades $$T_1 = B 2\pi R l \rho v^2 \quad (4)$$

But also from the lift on the B elements of chord C and radial length $l$ $$T_1 = BkC_L \frac{(v^2+V_p^2)C}{2} = 2B\pi R v^2 \quad (5)$$

where $C_L$ is the lift coefficient at the 0.7 radius ($0.7R_1$), and $V_p$ and $C$ are respectively the peripheral velocity and the chord at the 0.7 radius. See Figure 1. The coefficient $k$ is known from propeller theory (Aerodynamic Theory by W. F. Durand, vol. IV, page 242) to be 0.57 and is used to make the element of the blade at 0.7 radius representative of the whole propeller.

From Equation 4 we have—

$$kC_L(v^2+V_p^2) = \frac{4\pi R^2 v^2}{CR} = \frac{4v^2}{\sigma} \quad (6)$$

where $$\sigma = \frac{A}{\pi R^2} = \frac{Bc}{\pi R}, \quad A = \text{total blade area} = BR_c$$

Figure 2:
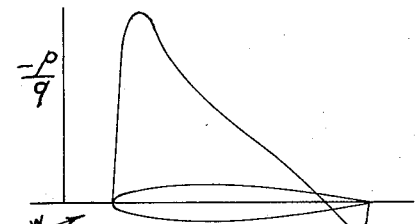
Figure 2 shows the pressure distribution over a symmetrical airfoil section.

Hence, $$\frac{v}{V_p} = \sqrt{\frac{kC_L\sigma}{4-kC_L\sigma}} = \tan\phi \quad (7)$$

where $\phi$ is the inflow angle as shown in Figure 2.

Then the angle of pitch of the blade section is $\beta = \alpha + \phi$ where $\beta$ is the effective pitch angle measured between the plane perpendicular to the axis of rotation and the zero lift line (L=O) of the section.

That is, $$\beta = \alpha + \tan^{-1}\sqrt{\frac{kC_L\sigma}{4-kC_L\sigma}} \quad (8)$$

in radians.

It is known from aerodynamic theory that $$C_L = 2\pi\alpha$$

in practice. Hence for $C_L = 1$ $$\beta \cong \frac{1}{2\pi} + \sqrt{\frac{0.57\sigma}{4-0.57\sigma}} \quad (9)$$

writing the angle in radians equal to its tangent which is very closely correct for the magnitude of angles involved.

If $\sigma = 0.06$, the effective pitch becomes $$\beta = 0.166 + \sqrt{\frac{0.0342}{3.966}}$$
$$= 0.166 + 0.0927 = 0.258 \text{ radian}$$
$$= 14.8°$$

The pitch angles used in this invention exceed 15 degrees or the value given by Equation 9.

The disk loading of the rotor is $$w = \frac{T_1}{\pi Rl}$$

and from Equation 4

$$w = BkC_L\frac{\rho}{2}(v^2+V_p^2)\frac{Cl}{\pi Rl} \quad (10)$$
$$= BkC_L\frac{\rho}{2}(v^2+V_p^2)\frac{CR}{\pi R^2}$$
$$= kC_L\frac{\rho}{2}(v^2+V_p^2)\sigma \quad (11)$$

Substituting for $v^2$ from Equation 6

$$w = kC_L\frac{\rho}{2}\left[V_p^2\left(\frac{kC_L\sigma}{4-kC_L\sigma}\right)+V_p^2\right]\sigma$$
$$= kC_L\frac{\rho}{2}V_p^2\left[1+\frac{kC_L\sigma}{4-kC_L\sigma}\right]\sigma \quad (12)$$

In a contemporary helicopter $C_L$ does not exceed 0.6 so that if $C_L$ is taken as 1.0, $w$ will be in excess of any present day practice or theory.

$$w = 0.57\frac{\rho}{2}V_p^2\left[1+\frac{0.57\sigma}{4-0.57\sigma}\right]\sigma \quad (13)$$

It is to be remembered that $V_p$ is at the 0.7 radius, that is at $0.7R_1$, and $\sigma$ is the solidity based on the chord C at the $0.7R_1$. That is $$\sigma = \frac{Bc}{\pi R}$$

From Equation 12

$$\frac{V_p^2}{w} = \frac{2}{0.57\rho\left(1+\frac{0.57\rho}{4-0.57\sigma}\right)\sigma} \quad (14)$$

In a typical rotor of practice which operates with a $C_L$ of about 0.4 the main dimensions are Tip $V = 400$; $V_p = 280$ f. p. s.
$R = 24$ ft.
$\sigma = 0.06$ If $C_L$ were as high as 1.0 then $$w = 0.57\frac{0.00237}{2}280^2 \times 0.060 = 3.18 \text{ lb./sq. ft.}$$

and the ratio $$\frac{V_p^2}{w} = \frac{280^2}{3.18} = 24{,}600 \quad (15)$$

The rotors of this invention are operated at $V_p^2/w$ less than 24,600 and/or effective pitch angles greater than 15 degrees.

Actually in contemporary practice the rotor of the example is operated at a lift coefficient of only 0.4 so that the disk loading $w$ is only about 2.87 lb./sq. ft.

The wing is adapted to the use of low internal air pressure by specially forming the airfoil section. By so doing the quantity of air and its pressure inside the wing can be kept to small values which makes the overall efficiency of the rotor satisfactory.

In the simplest form of the invention the internal pressure in the blades is realized from the centrifugal action due to the rotation of the rotor. In the preferred case the blower supplies air under some increase above the wind pressure, preferably of the order of 2 to 3 times the wind dynamic pressure $q = \rho V^2/2$ where $\rho$ is the mass density of the air and V is the relative wind velocity.

The location of the slot and the type of airfoil section are especially significant where only the centrifugal pumping action on the air in the blades is used to furnish the jet coming out of the blade slot, because then the amount of energy in the jet is less (due to frictional losses) than in the relative wind ahead of the blade. Consequently to achieve significant results the jet must be used efficiently and the boundary layer must lose only a minimum of energy before reaching the slot and have only a minimum of distance to proceed beyond the slot to the trailing edge. It is therefore important that the slot be placed as near the trailing edge as possible and precautions taken to assure the boundary layer flows as far rearward as possible.

Experiments on conventional airfoil sections (for instance experiments as reported in N. A. C. A. Technical Report No. 385) have shown that for aerodynamic effectiveness that proper location for a first discharge slot is at about 52 per cent of the chord aft of the leading edge which is too far forward to conserve enough of the energy of the jet up to the trailing edge if the initial pressure is low as I propose.

I have discovered that it is possible to place a first slot much further aft than the 52 per cent point if the airfoil section is given a special form. It should be so proportioned that the pressure gradient is favorable for the flow up to a point far back along the section. In the ordinary section the gradient is favorable for only about the first 15 per cent of the chord length as shown in Figure 2 and the momentum of the wind in the boundary layer must be sufficient to oppose the adverse pressure gradient from the 15 per cent point to the 52 per cent point if a slot were located at the latter point. The momentum is continuously being destroyed by the friction with the wing surface but enough is ordinarily preserved for the air to make the transit against the noseward acting suction for relatively small lift coefficients.

By designing the airfoil section so that the point of maximum suction is far back along the airfoil chord, the boundary layer loses less momentum and the region in which it must oppose an adverse gradient has been shifted toward the trailing edge. For instance, if the maximum suction ordinate is shifted from 0.15C to 0.5C, the slot could be shifted from 0.52C to 0.87C. Then the jet can make the traverse from the slot to the trailing edge with a very low pressure for relatively high lift coefficients. To accomplish the desired results the mean camber line maximum ordinate should have a value of the order of 5% to 20% of the chord length.

Figure 3:
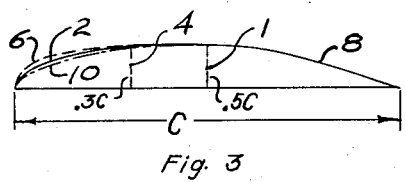
Figures 3 and 4 are diagrams defining the special airfoil form for the blades.
Figure 4:
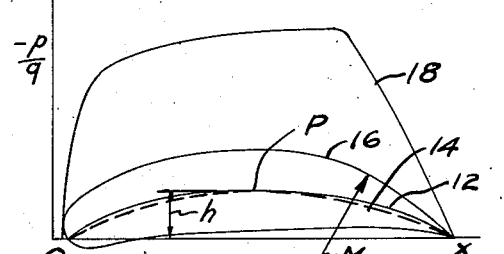
Figure 5:
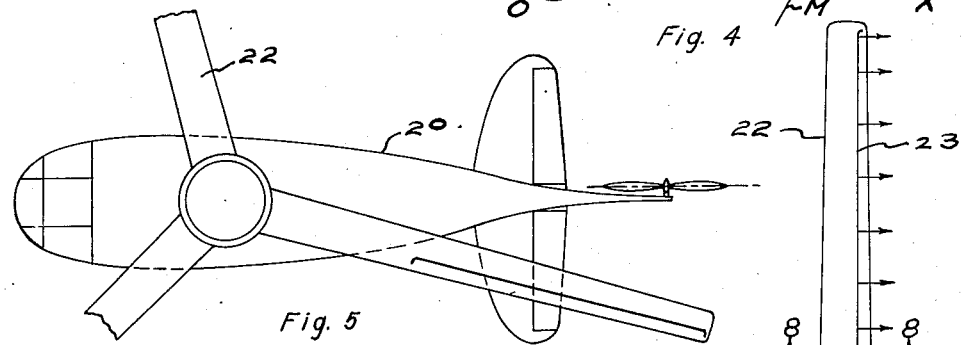
Figure 5 is a top plan view of the aircraft.
Figure 6:
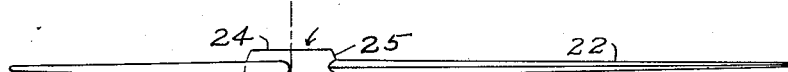
Figure 6 is side elevation of the aircraft.

The airfoil section which makes the low pressure jet effective is laid out as follows:

In Figure 3 is shown the construction of the basic airfoil section which is subsequently bent to have the proper shape of the mean camber line as shown in Figure 4. In Figure 3 only half of the section is shown.

At the midpoint of the chord the ordinate 1 equal to half the maximum thickness of the section is laid off. With this as the minor semi-axis, an elliptic quadrant 2 is laid off along the forward half of the chord C. Although the preferred location is at the midpoint, the maximum ordinate may be located between the 0.4C and 0.6C points.

With an ordinate 4 at the 0.3 point of the chord equal to 1 as another minor semi-axis, another elliptic quadrant 6 is laid out with 0.3C as the major semi-axis. This elliptic curve is continued horizontally to the ordinate 1. A curve 8 is faired into the former and continued to the trailing point to complete the sections.

A third curve 10 is determined from the first two by laying off perpendicular to C a distance below 2 equal to the distance of 6 above 2 at all points of the chord.

The proper airfoil section to provide the proper pressure distribution lies within the boundary curves 6 and 10. The boundary curves are immediately defined when one boundary curve and the mean curve are given.

To obtain the cambered airfoil the mean camber line 12 is constructed as in Figure 4 with its end portions lying preferably above a circle 14 drawn through the ends O and X and the midpoint P of the mean camber line. The maximum ordinate of the mean camber line is to be found from the following relation $$h = \frac{C_L}{16} \qquad (16)$$

where $h$ is the mean camber line maximum ordinate in per cent of the chord and $C_L$ is the coefficient for the operating regime. For hovering with a blade internal pressure of about 1 q, $C_L$ should be about 2. Equation 16 assures that, for this particular $C_L$, the flow will divide at the nose of the mean camber line and give the proper pressure distribution.

Stations are laid off along the mean camber line in per cent of the mean camber line length. The ordinates of the airfoil contour from Figure 3 are laid off perpendicular to the mean camber line above and below it at corresponding percentage stations giving the airfoil section 16 of Figure 4. This will have the pressure distribution curve 18 shown. With this form a slot can be located near the trailing edge with assurance that it will produce correct lift and drag for obtaining a large ratio of lift of the rotor to the horsepower expended.

The slot should extend along about 60 per cent of the radius of the blade measured from the tip. If a flap is used it should have about the same length.

When a blower is to be used to cause an internal pressure in the blade the section is to be designed for a larger value of the lift coefficient and the division of the flow at the nose of the mean camber line. Then for operation at a lower lift coefficient the flap is to be raised to reduce the camber. Thus the proper pressure distribution similar to curve 18 of Figure 4 is obtained for the important case of hovering but is not obtained for the lower lift coefficient used at high forward speed. However in forward flight the favorable pressure gradient is not needed.

The aircraft is operated at all times with free access of the internal air to the blade interiors.

This is efficient for low q's as may be observed from the following analysis:

On the advancing side the blade is moving forward with the combined velocities of translation and rotation. Since the efficiency of the jet is higher the nearer the speed of the jet approaches the blade speed, it is clear that the propulsive efficiency of the discharged jet is high on the advancing blade for low internal pressures.

On the retreating side, since the slot width is made small, only enough air is discharged to increase the lift in cooperation with the flap attitude. Even though the internal air pressure is low the increase in the blade lift coefficient is large because the relative wind past the retreating blade is low since the peripheral velocity is reduced by the forward translational velocity of the whole machine. It is the ratio of the jet velocity to the relative wind velocity which determines the effectiveness of the jet in controlling the boundary layer to produce lift.

Figure 8:
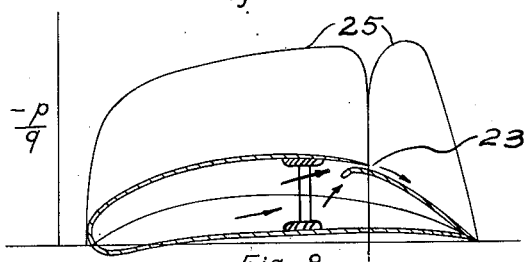
Figure 8 is a section along the line 8—8 in Figure 7.
Figure 7:
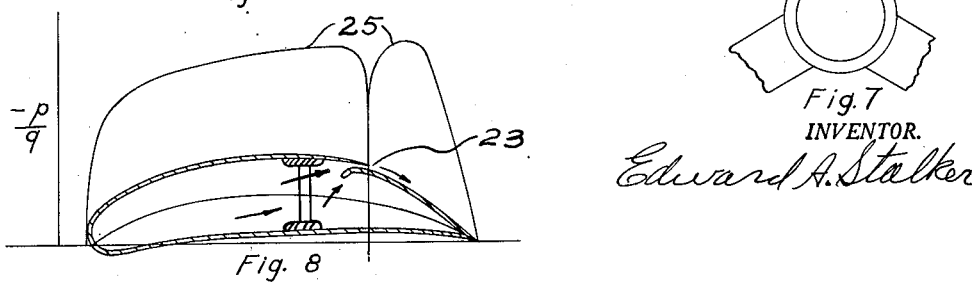
Figure 7 is a fragmentary top view of the rotor.
Figure 9:
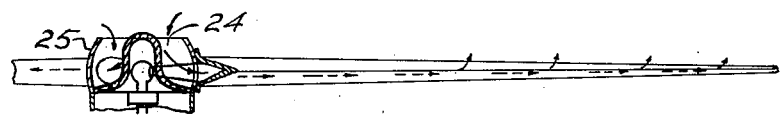
Figure 9 is a fragmentary front view of the rotor.

Referring particularly to the drawings of the aircraft as shown in Figures 1 to 10, the fuselage is 20 and the rotor is 21, composed of the blades 22. As shown in Figure 8 the blades have an airfoil section designed according to the method discussed with Figures 3 and 4 so as to achieve the proper lift-power relations by the use of the slot 23 through which air is discharged from the hollow interior of the wing. Figure 8 shows the pressure distribution curve 25 including the effect of the slot. The air enters the opening 24 in the hub housing 25, Figure 6, and is guided into the hollow blade interior.

The blades 22 are arranged for pivoting in the hub 26 in the manner shown in Figure 10 which will be described subsequently in connection with this second form of the invention.

In the preferred form of the invention Figures 10 to 13 the blades 30 are fitted with the flaps 36 which are rotatable about the hinges 38. In the hovering condition the flap is shown in about the hovering attitude which produces a favorable pressure gradient. For high forward speed the flap takes up a mean position 39 shown dotted.

Figure 10:
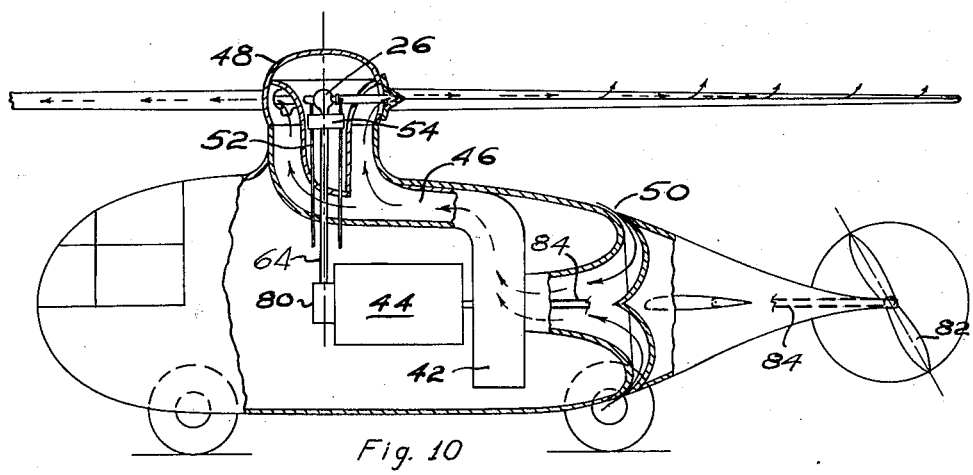
Figure 10 is a schematic side view of another form of the helicopter partly in section.
Figure 11:
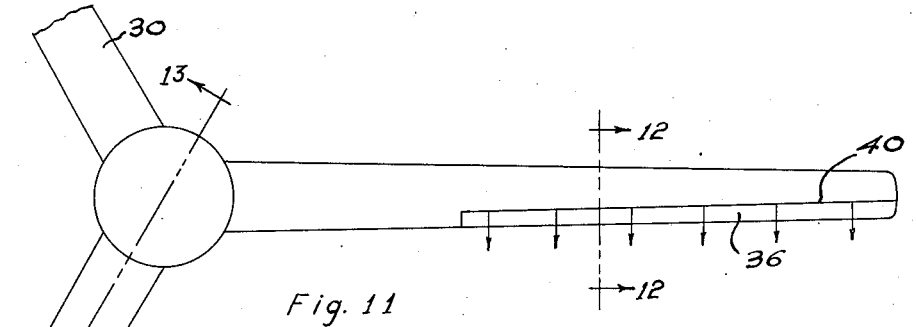
Figure 11 is a fragmentary top plan view of the rotor of the helicopter in Figure 10.
Figure 12:
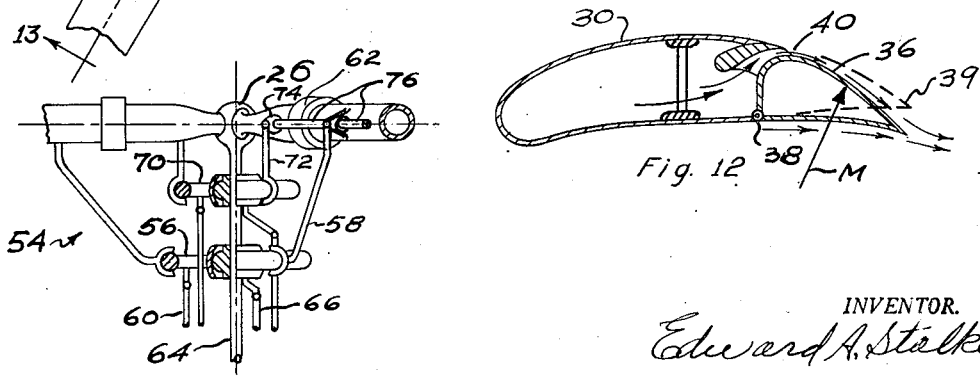
Figure 12 is a section along the line 12—12 in Figure 11.

The flap has the slot 40 in communication with the blade interior through which air is pumped by the blower 42 driven by the engine 44 as shown in Figure 10. The air is conducted from the blower by the duct 46 which takes on an annular cross section in entering the hub housing 48. The air for the blower is inducted through the fuselage slot 50.

The central fairing 52 houses the control mechanism 54 for controlling the attitude of the blades and flaps.

Figure 13:
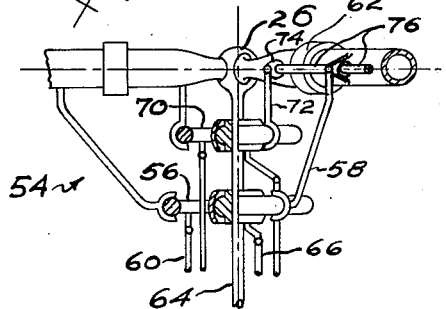
Figure 13 is a section in the plane of the axis of rotation and the longitudinal axis of the aircraft employing the rotor of Figure 11.

Figure 13 shows the control mechanism 54 with the case removed. It consists of the swash plate 56 on which ride the links 58. The swash plate is universally mounted and can be tilted by the pilot's control rods 60 and a like one spaced 90 degrees from 60. A tilting of plate 56 differentially rotates the main bodies of the blades in the rotary thrust bearing joint 62.

The swash plate may be slid vertically along shaft 64 by means of rod 66 to change the pitch equally of all the blades.

The flaps are controlled differentially by tilting a similar swash plate 70 upon which slide the links 72 connected to the flap actuating mechanism including the arm 74 and rod 76. This swash plate may also be slid vertically along shaft 64 to change all the flap angles uniformly.

In operation the engine rotates the main rotor blades by means of gear box 80, shaft 64 and the anti-torque propeller 82 by means of shaft 84 running to the engine. The blower forces air into the blades and out slots 40 but the jets contribute a very small or negligible thrust for rotating the blades.

During hovering the blades are set at effective angles of attack with the flaps somewhat depressed so that the wind divides substantially at the nose of the mean camber line of the section and a favorable pressure gradient occurs over the upper surface as described previously. Under this condition the largest lift-horsepower ratio occurs for hovering. The value of the lift coefficient then approaches 3.0 for the scheme of Figures 10 to 13.

The aft upper contour of the airfoil sections 22 and 30 has a positive radius of curvature M. It is defined as positive when it lies on the inside of the section contour.

To recapitulate, I provide a helicopter rotor whose blades are adapted to the use of a slot in the rear portion of the blades. The forward portion of the airfoil section is formed to assure that the relative wind will follow the blade surface as far rearward as the discharge slot. (Such a slot cannot influence the flow upstream as a suction slot can.) At the slot the discharged jet takes hold and keeps the relative wind or main flow following the contour for relatively large lift coefficients for a helicopter blade. The jet originates from low pressure air so that it is highly economical of energy and yet, because of its rearward location, can make the main flow follow the blade surface.

It is a feature of this invention that the wing or blade has a special airfoil section so that the flow divides at the nose point of the mean camber line when the blade is set at the large pitch prescribed by the theory to make the lift-power ratio a maximum.

The jets cannot waste energy or the ratio of lift of the rotor to the power expended will not show a gain over conventional rotors operating with lift coefficients of the order of 0.6.

The blades are operated at a large pitch angle and lift coefficient so that the power ordinarily expended on profile drag is a minimum. This power varies as the cube of the rate of rotation and by reducing the rate of rotation a saving of about 25 per cent is made in power. The lift is then obtained from the larger lift coefficient rather than a high rate of rotation.

To conserve energy the interior of the blades are made smooth and free of all obstruction like valves or abrupt changes in cross section. The rotor is operated in hovering with free access of the air to all blades and as it moves forward the air still continues to have as free access to the blade interior in one orbital position as in another.

While I have illustrated a specific form of this invention it is to be understood that I do not intend to limit myself to this exact form but intend to claim my invention broadly as indicated by the appended claim.

What is claimed is:

The combination, in a direct lift aircraft, of a hub, a blade supported on said hub and extending radially therefrom, means to support said hub for rotation about an upright axis, power means to rotate said hub and blade about said axis to support the aircraft, said blade having a flap adjustable from a raised position to a lowered increased lift position, the chord of said flap at the 0.7 point of the blade span being less than 0.3 of the corresponding blade section chord, said blade section being formed over a mean camber line whose maximum ordinate above the subtending chord is greater than 5 percent and less than 20 percent of said chord length, said blade in the attitude for hovering flight being defined by an orbitally uniform pitch angle greater than 15° and less than 50° with a uniform flap position throughout the orbital positions of the blade, said camber line producing a concave lower contour for said section, means to displace said flap on opposite sides of said hovering flap position for the advancing and retreating orbital positions of said blade resulting in an abruptly deformed mean camber line, said blade having a discharge slot in its upper surface directed toward the trailing edge and leading out of the blade interior, means forming an inlet continuously open throughout the cycle of orbital positions of the blade for inducting atmospheric air adjacent the aircraft into said blade, and means forming an internal substantially unobstructed flow passage extending from said inlet to said slot for a flow of inducted air therethrough under the centrifugal pressure resulting from rotation of said blade, said internal passage extending from said slot to said inlet in open communication with the atmosphere for the free intake of air at substantially atmospheric pressure.

EDWARD A. STALKER.

REFERENCES CITED

The following references are of record in the file of this patent:

UNITED STATES PATENTS

| Number | Name | Date |
|---|---|---|
| 1,420,619 | Barton | June 27, 1922 |
| 1,890,519 | Leray | Dec. 13, 1932 |
| 2,007,506 | Smith | July 9, 1935 |
| 2,041,787 | Stalker | May 26, 1936 |
| 2,041,789 | Stalker | May 26, 1936 |
| 2,084,464 | Stalker | June 22, 1937 |
| 2,372,030 | Stalker | Mar. 20, 1945 |
| 2,380,581 | Prewitt | July 31, 1945 |
| 2,408,489 | Stalker | Oct. 1, 1946 |
| 2,443,808 | Stalker | June 22, 1948 |

FOREIGN PATENTS

| Number | Country | Date |
|---|---|---|
| 592,393 | France | Apr. 29, 1925 |
| 370,504 | Great Britain | Apr. 14, 1932 |
| 625,166 | Germany | Feb. 5, 1936 |

OTHER REFERENCES

"Flight," pages 450–452, November 4, 1937.